(12) United States Patent
Weiss

(10) Patent No.: US 11,041,463 B1
(45) Date of Patent: Jun. 22, 2021

(54) TURBINE ENGINE STRUCTURE WITH OXIDIZER ENHANCED MODE

(71) Applicant: United Technologies Corporation, Hartford, CT (US)

(72) Inventor: Carl F. Weiss, Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 837 days.

(21) Appl. No.: 14/619,382

(22) Filed: Feb. 11, 2015

(51) Int. Cl.
| | |
|---|---|
| F02K 7/16 | (2006.01) |
| F02K 3/06 | (2006.01) |
| F02K 3/11 | (2006.01) |
| F02C 7/268 | (2006.01) |
| F02K 3/04 | (2006.01) |

(52) U.S. Cl.
CPC ............... *F02K 7/16* (2013.01); *F02C 7/268* (2013.01); *F02K 3/04* (2013.01); *F02K 3/06* (2013.01); *F02K 3/11* (2013.01); *F05D 2220/10* (2013.01)

(58) Field of Classification Search
CPC ... F02K 7/10; F02K 7/16; F02K 3/105; F02K 3/11; F02K 7/277; F02K 7/268; F02K 7/275; F02K 3/06; F02K 7/12; F02K 7/14; F02K 7/18; F02K 7/20; F02K 7/27; F02K 3/10; F05D 2220/10; F02C 7/268; F02C 7/27; F02C 7/275; F02C 7/277
See application file for complete search history.

(56) References Cited

U.S. PATENT DOCUMENTS

| | | | | |
|---|---|---|---|---|
| 2,696,079 | A * | 12/1954 | Kappus | F02K 3/11 60/226.1 |
| 2,952,973 | A * | 9/1960 | Hall | F02C 7/277 60/244 |
| 2,955,414 | A * | 10/1960 | Hausmann | F02K 3/12 60/242 |
| 3,002,340 | A | 10/1961 | Landerman | |
| 3,432,100 | A * | 3/1969 | Hardy | F02K 3/11 239/127.3 |
| 3,677,012 | A * | 7/1972 | Batscha | F02K 3/065 60/262 |
| 3,812,672 | A | 5/1974 | Escher | |

(Continued)

FOREIGN PATENT DOCUMENTS

| | | | |
|---|---|---|---|
| FR | 2687433 | 8/1993 | |
| FR | 2687433 A1 * | 8/1993 | ............... F02K 7/10 |
| GB | 2205360 | 12/1988 | |

OTHER PUBLICATIONS

Janes's Aero Engines, Issue Seven, Edited by Bill Gunston, Jane's Information Group Inc. Alexandria, VA, 2000, p. 1-47 & 510-512.*

(Continued)

*Primary Examiner* — Alain Chau
(74) *Attorney, Agent, or Firm* — Carlson, Gaskey & Olds, P.C.

(57) ABSTRACT

A turbine engine structure includes a turbine engine core having a core cocooning feature, and a fan fore of the turbine engine core, relative to fluid flow through the turbine engine structure. The fan is drivably connected to the turbine engine core via a shaft. A nacelle circumferentially surrounds the turbine engine core, and a bypass flowpath is defined between the turbine engine core and the nacelle. A plurality of augmenter fuel spray bars are disposed in the bypass flowpath.

17 Claims, 3 Drawing Sheets

(56) References Cited

U.S. PATENT DOCUMENTS

| | | | | |
|---|---|---|---|---|
| 3,938,328 A * | 2/1976 | Klees | ............... | F02K 3/04 60/262 |
| 4,137,708 A * | 2/1979 | Aspinwall | ............... | F02K 7/16 60/204 |
| 4,543,785 A * | 10/1985 | Patrick | ............... | F02K 7/16 60/263 |
| 4,909,031 A * | 3/1990 | Grieb | ............... | F01D 7/00 60/225 |
| 5,003,767 A * | 4/1991 | Rodgers | ............... | F02C 7/277 60/788 |
| 5,012,638 A * | 5/1991 | Grieb | ............... | F02C 3/22 60/224 |
| 5,052,176 A | 10/1991 | Labatut et al. | | |
| 5,054,284 A * | 10/1991 | Shekleton | ............... | F02C 7/277 60/262 |
| 5,076,052 A * | 12/1991 | Wildner | ............... | F02C 7/042 60/244 |
| 5,094,071 A * | 3/1992 | Jabs | ............... | F02K 7/16 137/15.1 |
| 5,105,615 A * | 4/1992 | Herzog | ............... | F02C 7/042 137/15.1 |
| 5,160,080 A | 11/1992 | Hines et al. | | |
| 5,272,870 A | 12/1993 | Grieb et al. | | |
| 5,694,768 A * | 12/1997 | Johnson | ............... | F02K 3/075 60/226.3 |
| 6,868,664 B2 * | 3/2005 | Albero | ............... | F02K 3/12 60/224 |
| 7,216,474 B2 * | 5/2007 | Bulman | ............... | B64C 30/00 244/53 B |
| 7,305,816 B2 | 12/2007 | Freese et al. | | |
| 7,721,524 B2 | 5/2010 | Jahnsen | | |
| 8,281,567 B2 | 10/2012 | Kohn | | |
| 8,695,540 B2 | 4/2014 | Minick | | |
| 2002/0017096 A1 * | 2/2002 | Hubbard | ............... | F02K 3/075 60/226.3 |
| 2003/0079463 A1 | 5/2003 | McKinney | | |
| 2004/0211166 A1 * | 10/2004 | Albero | ............... | F02C 7/277 60/226.1 |
| 2009/0120057 A1 | 5/2009 | Kohn | | |
| 2013/0305686 A1 * | 11/2013 | Conrardy | ............... | F02K 7/16 60/226.1 |

OTHER PUBLICATIONS

Extended European Search Report for Application No. 16155305.2 dated Jul. 6, 2016.

* cited by examiner

TURBINE ENGINE STRUCTURE WITH OXIDIZER ENHANCED MODE

TECHNICAL FIELD

The present disclosure relates generally to turbine engine structures, and particularly to a turbine engine structure including an oxidizer enhanced duct burner propulsion mode.

BACKGROUND

Turbofan engines typically include an engine core having a compressor, a combustor, and a turbine section. The compressor, combustor and turbine section operate cooperatively to drive rotation of a shaft. The shaft is connected to a fan either directly, in a direct drive configuration, or via a gearing system in a geared turbofan configuration. The fan drives air along a bypass flowpath and through the engine core. Existing turbofan engines are unable to exceed certain Mach numbers, even with the inclusion of features designed to mitigate the effects of high speeds.

SUMMARY OF THE INVENTION

In one exemplary embodiment, a turbine engine structure includes a turbine engine core including a core cocooning feature a fan fore of the turbine engine core, relative to fluid flow through the turbine engine structure, wherein the fan is drivably connected to the turbine engine core via a shaft, a nacelle circumferentially surrounding the turbine engine core, a bypass flowpath defined between the turbine engine core and the nacelle, and a plurality of augmenter fuel spray bars disposed in the bypass flowpath.

In another exemplary embodiment of the above exemplary embodiment the turbine engine core is configured to be open in a first condition and cocooned in a second condition, and wherein the first condition is a Mach speed of the turbine engine structure below a first predetermined threshold, and the second condition is a Mach speed of the turbine engine structure above a second predetermined threshold.

In another exemplary embodiment of any of the above exemplary embodiments the plurality of augmenter fuel spray bars are configured to operate as a duct burner in a third condition, wherein the third condition is a Mach speed of the turbine engine structure between the first predetermined threshold and the second predetermined threshold.

An exemplary embodiment of any of the above exemplary embodiments further includes a jet fuel motor configured to drive a shaft, the shaft being further connected to the fan, such that the shaft is capable of driving the fan.

In another exemplary embodiment of any of the above exemplary embodiments the jet fuel motor is configured to operate as a starter motor.

In another exemplary embodiment of any of the above exemplary embodiments the jet fuel motor is configured to drive the fan at a unobstructed flow operating condition when the Mach speed of the turbine engine structure is above a predetermined threshold.

An exemplary embodiment of any of the above exemplary embodiments further includes a controller controllably coupled to at least the engine core and the augmenter fuel spray bars and wherein the controller is configured to control the core cocooning feature.

An exemplary embodiment of any of the above exemplary embodiments further includes an oxidizer injector configured to at least partially supplement air in the bypass flowpath with an oxidizer when the engine is operating in a second condition, the second condition is a Mach speed of the turbine engine structure above a second predetermined threshold.

An exemplary embodiment of any of the above exemplary embodiments further includes a cooling system configured to cool at least one of non-core engine static structures and the fan using one of a jet fuel and an oxidizer.

In another exemplary embodiment, a turbine engine structure includes an engine structure configured to operate as a turbofan engine in a first condition and configured to operate as a duct burner enhanced with oxidizer engine in a second condition.

In another exemplary embodiment of any of the above exemplary embodiments the first condition is a Mach speed of the turbine engine structure below a first predetermined threshold, and the second condition is a Mach speed of the turbine engine structure above a second predetermined threshold.

In another exemplary embodiment of any of the above exemplary embodiments the engine structure is further configured to operate as a duct burner engine in a third condition.

In another exemplary embodiment of any of the above exemplary embodiments the third condition is a Mach speed of the turbine engine structure between a first predetermined threshold and a second predetermined threshold.

An exemplary embodiment of any of the above exemplary embodiments further includes a jet fuel motor configured to drive an engine fan at a speed of invisibility during the second condition.

An exemplary embodiment of any of the above exemplary embodiments further includes an oxidizer injector operable to at least partially supplement air in a bypass flowpath with an oxidizer while the engine structure is in the second condition.

In another exemplary embodiment of any of the above exemplary embodiments the engine structure is configured to operate as a direct drive turbofan engine in the first condition.

In another exemplary embodiment, a method for operating a turbine engine includes operating a turbine engine structure in a turbofan mode when the engine is in a first condition, cocooning the turbine engine structure when the turbine engine structure enters a second condition, and operating the turbine engine structure in a duct burner enhanced with oxidizer mode when the turbine engine structure is in the second condition.

An exemplary embodiment of any of the above exemplary embodiments further includes operating the turbine engine structure in an a duct burner mode when the turbine engine structure is in a third condition.

In another exemplary embodiment of any of the above exemplary embodiments cocooning the turbine engine structure incudes at least partially restricting air flow into an engine core such that the engine core is not operating as a gas turbine engine.

In another exemplary embodiment of any of the above exemplary embodiments operating the turbine engine structure in the duct burner enhanced with oxidizer mode incudes at least partially supplementing air in a flowpath of the turbine engine structure with an oxidizer upstream of a plurality of jet fuel burners.

These and other features of the present invention can be best understood from the following specification and drawings, the following of which is a brief description.

DETAILED DESCRIPTION OF AN EMBODIMENT

Figure 1:
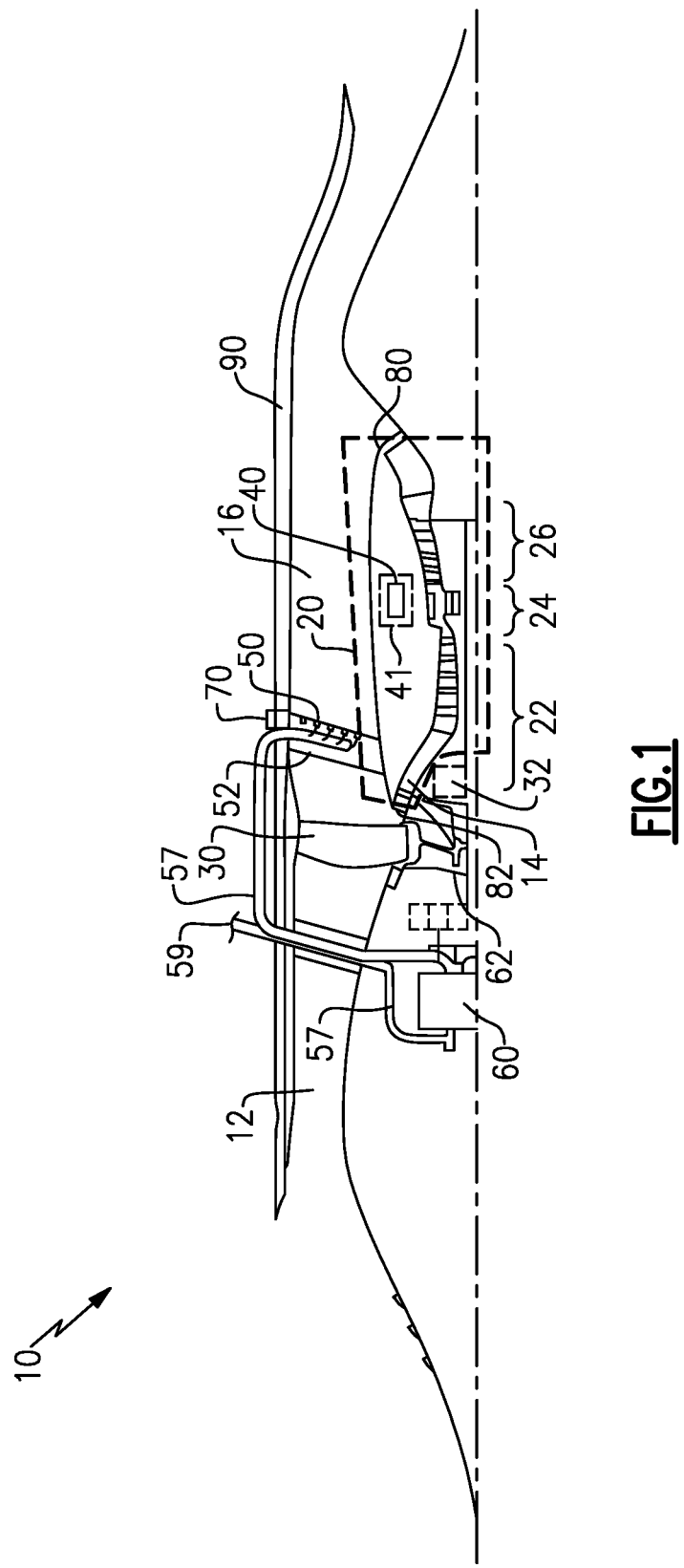
FIG. 1 schematically illustrates an exemplary turbine engine structure.

FIG. 1 schematically illustrates an exemplary turbine engine structure 10. The turbine engine structure 10 includes a flowpath 12 that splits into a core flowpath 14 and a bypass flowpath 16. The core flowpath 14 passes through an engine core 20 including a compressor section 22, a combustor section 24 and a turbine section 26. Fore of the engine core 20 is a fan 30 that spans the flowpath 12. Fore of the fan 30 is an inlet that provides minimal pressure loss and a desired mass flow of the incoming air. The fan 30 is connected to the engine core 20 in the illustrated embodiment via a gear 32. The connection between the fan 30 and the engine core 20 allows the engine core 20 to drive rotation of the fan 30 in the flowpath 12. In alternative examples, the fan 30 is directly connected to the engine core 20 via a shaft in a direct drive arrangement instead of the illustrated geared connection. The engine core 20 utilizes standard turbofan operations to generate thrust in combination with the fan 30 during low speed operations and take off/landing.

Further, included in the turbine engine structure 10 is a variable area convergent/divergent nozzle at an exit end of the flowpath 12. The area ratios and absolute areas of the convergent/divergent nozzle are scheduled to optimize engine operations throughout the engine modes.

A controller 40 controls operations of the engine core 20, as well as other operations within the turbine engine structure 10. In some embodiments, the controller 40 is positioned within the engine core 20 as illustrated in FIG. 1. By way of example, the illustrated engine core 20 includes a cooling system 41, providing a suitable location for housing the controller 40. In alternative embodiments, the controller 40 can be positioned elsewhere on the turbine engine structure 10, or exterior to the turbine engine structure 10, depending on the structure and needs of a specific turbine engine structure.

Further included in the turbine engine structure 10 are cocooning mechanisms 80, 82. Each of the cocooning mechanisms 80, 82 are configured to partially or completely cocoon the engine core 20 from the flowpath 12. Cocooning the engine core 20 includes isolating the engine core 20 from the flowpath 12 and preventing air in the flowpath 12 from entering the engine core 20. By preventing air from entering the engine core 20, turbine engine operations are halted and thrust is provided by the burning of jet fuel at the augmenter fuel spray bars 50. While cocooned, the engine core 20 is rotated by the jet fuel motor 60. Further, while cocooned, the engine core 20 is cooled by the cooling system 41 in order to protect the engine core from heat associated with the high Mach modes of operation. During the high Mach modes of operation the remaining engine static structure is cooled using either jet fuel or oxidizer. In some examples, the fan 30 is further cooled by passing jet fuel through the fan and expelling the jet fuel from the fan blades. In these examples, a duct burner zone is created immediately aft of the fan. In the illustrated example, the cocooning mechanism takes the form of a physical barrier at an inlet of the core flowpath 14 and a physical barrier at an outlet of the core flowpath 14. In order to operate the engine in a turbine mode again, the cocooning mechanisms 80, 82 allow air back into the engine core, and the turbine engine operations are restarted via the jet fuel motor 60.

The engine core 20 is supported radially, relative to a nacelle 90 housing the engine core 20, by multiple struts 52 arranged circumferentially around the engine core 20. Disposed across at least some of the struts 52 are multiple augmenter fuel spray bars 50. The augmenter fuel spray bars 50 are arranged circumferentially around the engine core 20, as with the struts 52 and operate in conjunction with each other as a duct burner. In alternative embodiments, the augmenter fuel spray bars 50 can be positioned in the flowpath 12 using an alternative support structure and achieve the same effect.

Each of the augmenter fuel spray bars 50 is connected to a jet fuel repository, such as a jet fuel tank, via one or more jet fuel supply tubes 57. The jet fuel supply tubes 57 are connected to the jet fuel repository at an inlet 59, and are capable of supplying jet fuel to the augmenter fuel spray bars 50 and to the jet fuel motor 60. Jet fuel is provided from the jet fuel repository, and ignited at the augmenter fuel spray bars 50 to provide additional thrust, when the additional thrust is needed. At mid speed operations, the augmenter fuel spray bars 50 operate as an afterburner (alternately referred to as an augmenter or a re-heater). At high speed operations, the augmenter fuel spray bars 50 are supplemented with oxidizer injected at a near location or upstream in the jet engine. In the example of FIG. 1, the operations of the augmenter fuel spray bars 50 are controlled by the controller 40. In alternative examples, a dedicated jet fuel burner controller can be used in place of the general engine controller 40.

A Jet fuel motor 60 is connected to the fan 30. The jet fuel motor 60 is a motor that operates off jet fuel and oxidizer. The jet fuel motor utilizes combustion of jet fuel within an environment at least partially comprising an oxidizer agent to generate rotational movement of a shaft. The shaft of the jet fuel motor 60 is physically connected to the fan 30 through a gearbox. The jet fuel motor 60 operates as a starter motor for the turbine engine structure 10. In another mode, at high speed when the engine core 20 is cocooned, the jet fuel motor 60 drives the fan to rotate it fast enough such that the delta pressure across the fan is zero or greater. In the illustrated example, the jet fuel motor 60 is connected to the fan 30 via a gearing system 62. Unlike a conventional jet fuel based starter motor, the jet fuel motor 60 combusts jet fuel with oxidizer to generate rotational motion. In alternative systems, the jet fuel motor 60 can be connected to the fan 30 directly in a direct drive fashion.

In some examples, the jet fuel motor 60 provides two primary functions during operation of the turbine engine structure 10. Initially, the jet fuel motor 60 operates as a starter motor providing initial rotational motion through the fan to the engine core 20, allowing the turbine engine structure 10 to begin operations for takeoff. Once operating, when the turbine engine structure 10 enters high speed operations where the engine 10 functions in an augmenter mode, the jet fuel motor 60 drives the fan 30 to rotate fast enough that the fan 30 does not impart drag on the air entering the flowpath 12. Driving the fan at a condition where the pressure rise across it is approximately zero effectively renders the fan invisible for the purposes of fluid flow through the turbine engine structure 10, and both keeps the fan from interfering with high speed performance and maintains the rotation of the gearbox to drive the engine accessories (fuel pumps, oil pumps, generators, etc.) when the core is cocooned. The operating condition at which this is accomplished is referred to as an unobstructed flow operating condition for the fan.

Further included at, or near, the augmenter fuel spray bars 50 are one or more oxidizer injectors 70. The oxidizer injectors 70 inject an oxidizer, such as Liquid Oxygen, Nitrous Oxide, a combination of the foregoing, or Hydrogen Peroxide, into the flowpath 12, thereby supplementing the air passing through the flowpath 12 with the oxidizer. The oxidizer allows more fuel to be combusted and reduces the ram drag proportional to the amount of fuel combusted.

With continued reference to the turbine engine 10 described above and illustrated in FIG. 1, FIG. 2 is a flowchart 100 illustrating the modes of operation in which the turbine engine structure 10 can function. Initially, the engine 10 operates in an engine startup mode 110. Once the engine core 20 has been started, the engine 10 continues operations during takeoff, landing, and other low speed operations in a turbofan mode 120. In the turbofan mode 120, the engine is operating as a standard gas turbine engine. The turbofan mode 120 is unable to provide sufficient thrust to maintain the aircraft at speeds above a certain Mach level. By way of example, in some engines, low speed operations cannot safely exceed sonic speeds.

When the aircraft needs to exceed the safe low speed operations, the engine 10 enters a turbofan with duct burner mode 130. In other embodiments, the turbofan with duct burner mode can be entered while the aircraft is on the ground just prior to take-off. In the turbofan with duct burner mode 130, the augmenter fuel spray bars 50 are ignited and operate the turbine engine structure 10 as a duct burning turbine engine, providing additional thrust and enabling higher Mach speeds. By way of example, in one embodiment during mid speed operations, the engine 10 can safely operate at up to Mach 2.0-2.5. The operations in the turbofan with duct burner mode 130 are described in greater detail below, with regards to FIG. 3.

Due to turbine engine limitations, including drag, cooling, and the like, practical implementations of duct burning turbine engines are incapable of exceeding certain Mach numbers. When a velocity in excess of the practical limitations on a turbine engine is desired, the turbine engine 10 transitions to a higher speed operations mode 140, where the engine operates as a duct burner only and the turbine engine operations are temporarily deactivated. Duct burner only mode operations are described in greater detail below with regards to FIG. 4.

Due to duct burner only engine limitations, including cooling, exhaust gas velocity and the like, practical limitations of duct burner only engines prevent the duct burner only engines from exceeding certain Mach numbers. When a velocity in excess of the practical limitations is desired, the engine transitions to a higher speed operation mode 150 where the combustion duct burner in the duct burner is enhanced with oxidizer. Duct burner enhanced with oxidizer mode operations are described in greater details with regards to FIG. 5.

Figure 2:
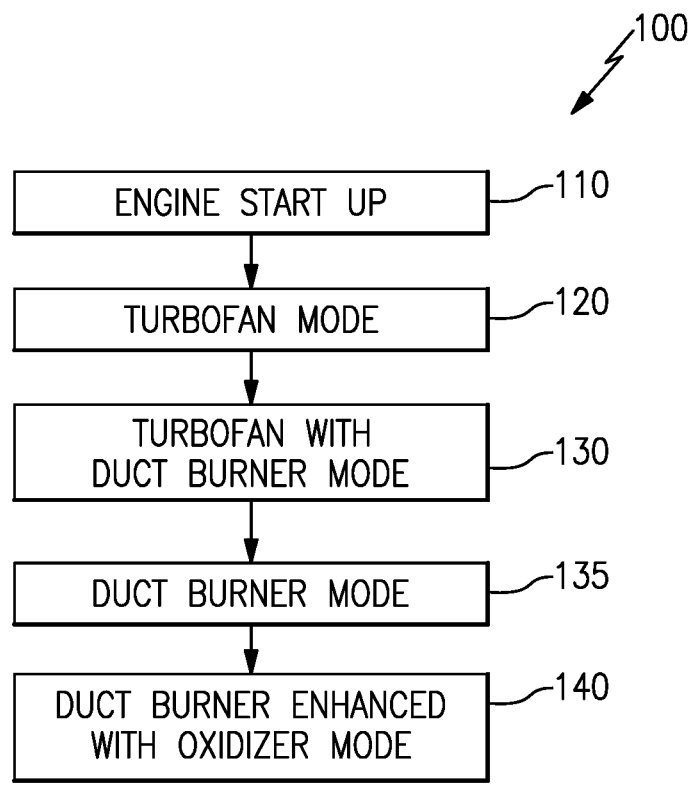
FIG. 2 illustrates a flowchart detailing operations of the turbine engine structure of FIG. 1.
Figure 3:
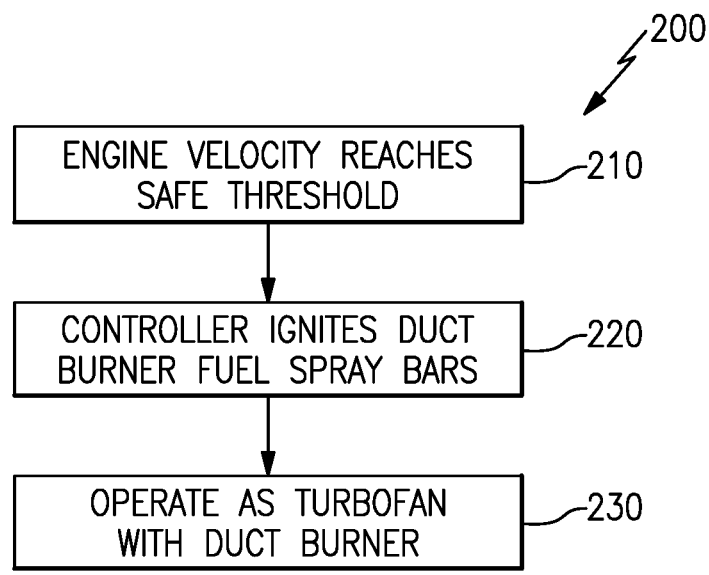
FIG. 3 illustrates a flowchart demonstrating a transition of the engine to a turbofan duct burner mode.

With continued regards to FIGS. 1 and 2, FIG. 3 illustrates a flowchart 200 demonstrating transition of the engine to the mid speed operations mode 130, and operations within the turbofan with duct burner mode 130. Initially, when the engine speed reaches the safe threshold of standard turbine engine operations at block 210, the controller 40 begins ignition of the augmenter fuel spray bars 50 at block 220. Once the augmenter fuel spray bars 50 are ignited, the resultant combustion gasses are expelled through the bypass flowpath 16, increasing the thrust provided during the turbofan with duct burner mode 130. Once the augmenter fuel spray bars 50 are fully ignited, the turbine engine structure 10 is operated as an duct burning turbine engine at block 230.

Simultaneous with receiving the thrust boost from the augmenter fuel spray bars 50 operating as afterburners, the engine core 20 continues to provide standard gas turbine engine operations, drawing air into the core flowpath 14 upstream of the augmenter fuel spray bars 50. In the core flowpath 14, the compressor section 22 compresses the air, the combustor section 24 mixes the compressed air with a fuel, and ignites the mixture, and the resultant combustion gasses are expanded across the turbine section 26. The expansion of the resultant combustion gasses drives the turbine section 26 to rotate, which in turn drives a shaft. The gasses are exhausted from the turbine section 26, join the exhaust gasses from the afterburner and are expelled from the engine 10.

While operating as an afterburner, the jet fuel from the augmenter fuel spray bars 50 is mixed with air passing through the flowpath 12 in a typical afterburner fashion. Due to the composition of the air and the materials of the engine 10, there is a condition that cannot realistically be exceeded. As a result of the limiting condition, the magnitude of thrust that can be provided in the turbofan with duct burner mode 130 limits the engine 10 to traveling at approximately Mach 2.0-2.5. The specific engine speed limit of a given engine 10 can be empirically or theoretically determined, and the engine controller 40 can utilize a predetermined speed threshold to determine when the transition from the turbofan with duct burner mode 130 to the duct burner enhanced with oxidizers mode 140 is necessary.

Figure 4:
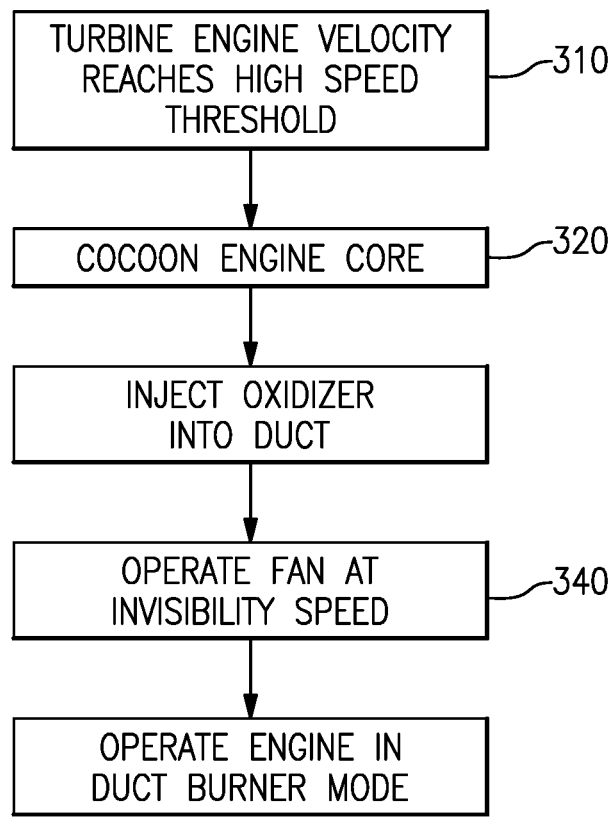
FIG. 4 illustrates a flowchart demonstrating a transition of the engine to a duct burner only mode.

With continued reference to FIGS. 1-3, the transition to, and operations in, the duct burner only mode 140 is illustrated in FIG. 4. When the engine 10 reaches the velocity threshold, the engine 10 enters the duct burner only mode 140 at block 310. Initially, the controller 40 cocoons the engine core 20 using the engine cocooning mechanisms 80, 82 at a cocoon engine core block 320. Cocooning the engine core 320 partially or completely blocks a flow of air from said flowpath 12 into said core flowpath 14, thereby preventing air from entering the engine core 20, and preventing the engine core 20 from operating as a turbine engine. While the illustrated embodiment utilizes mechanical mechanisms 80, 82 to cocoon the engine core 20, one of skill in the art, having the benefit of this disclosure, will understand that any alternate cocooning system capable of at least partially blocking airflow into the core flowpath 14 can function in a similar capacity.

Once the engine core 20 is cocooned, the jet fuel motor 60 continues to rotate the engine spool at block 340. The jet fuel motor 60 drives the spool such that the delta pressure across the fan is zero or greater and does not impede flow to the duct burner, such that the engine accessories (fuel pumps, oil pumps, generator, etc.) still operate and that brinelling of the engine bearings is avoided. As described above, this rotational speed of the fan required to achieve this state is referred to as a speed of invisibility.

Figure 5:
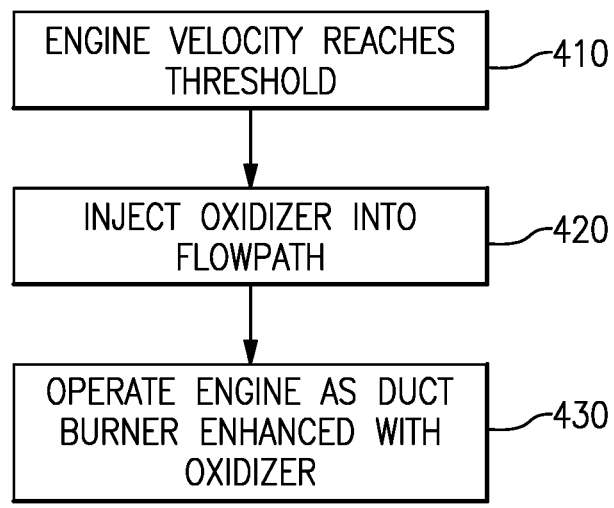
FIG. 5 illustrates a flowchart demonstrating transition from a duct burning only mode to a duct burner enhanced with oxidizer mode.

In some examples, Mach speeds higher than can practicably be achieved by a duct burner only mode are required. In such an example, the engine 10 includes a duct burner enhanced with oxidizer mode. FIG. 5 illustrates a flowchart demonstrating transition from a duct burning only mode to a duct burner enhanced with oxidizer mode. Initially, the engine 10 reaches a velocity threshold that is at or near the practical limit of the duct burner mode at block 410.

When the threshold is reached, the engine 10 begins injecting oxidizer into the flowpath at block 420, entering the duct burner with oxidizer enhancement mode 150. Once the engine enters the duct burner with oxidizer enhancement mode 150, the oxidizer injector 70 begins injecting an oxidizing agent into the flowpath 12 at or near the augmenter fuel spray bars 50. The oxidizer is a combustible compound that replaces at least a portion of the air passing through the flowpath. By replacing the some of the air with the oxidizer, the engine 10 can provide the necessary thrust to operate at increased Mach numbers. In this mode, the engine 10 is operating as an oxidizer enhanced augmenter. Once the engine 10 has begun injecting oxidizer into the flowpath, the engine 10 operates as a duct burner enhanced with oxidizer at block 430.

In some examples, the oxidizer is one of liquid oxygen, nitrous oxide and hydrogen peroxide. In the illustrated example of FIG. 1, the oxidizer is liquid oxygen. In another example, the oxidizer is a combination of liquid oxygen and nitrous oxide. In practical operations a substantial portion of the air passing through the flowpath is replaced with the oxidizer. By way of example 75%-80% of the air passing through the flowpath 12 can be replaced with the oxidizer. The oxidizer/air mixture is then ignited by the augmenter fuel spray bars 50, creating the heated combustion gasses.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine engine structure comprising:
   a turbine engine core including a core cocooning feature configured to selectively cocoon the turbine engine core by at least partially isolating the turbine engine core from a flowpath and preventing air in the flowpath from entering the turbine engine core, such that the turbine engine core is prevented from operating as a turbine engine while cocooned;
   a fan fore of said turbine engine core, relative to fluid flow through said turbine engine structure, wherein the fan is drivably connected to said turbine engine core via a shaft;
   a nacelle circumferentially surrounding said turbine engine core;
   a bypass flowpath defined between said turbine engine core and said nacelle;
   a plurality of augmenter fuel spray bars disposed in said bypass flowpath; and
   a jet fuel motor distinct from and exterior to the turbine engine core and drivably connected to a second shaft, the second shaft being further connected to said fan, such that said jet fuel motor is configured to drive said fan while the turbine engine core is cocooned, wherein the jet fuel motor is a combustion motor configured to combust a jet fuel within an environment at least partially comprising an oxidizer;
   an oxidizer injector configured to at least partially supplement air in said bypass flowpath with the oxidizer when said turbine engine core is cocooned; and
   a controller controllably coupled to at least said turbine engine core and said augmenter fuel spray bars and wherein the controller is configured to control the core cocooning feature such that the turbine engine core is configured to be open in a first condition and cocooned in a second condition, and wherein the first condition is a Mach speed of the turbine engine structure below a first predetermined threshold, and the second condition is a Mach speed of the turbine engine structure above a second predetermined threshold.

2. The turbine engine structure of claim 1, wherein said controller is configured to operate the plurality of augmenter fuel spray bars as a duct burner in a third condition, wherein the third condition is a Mach speed of the turbine engine structure between the first predetermined threshold and the second predetermined threshold.

3. The turbine engine structure of claim 1, wherein the jet fuel motor is configured to operate as a starter motor.

4. The turbine engine structure of claim 1, wherein the jet fuel motor is configured to drive said fan at an unobstructed flow operating condition while the engine core is cocooned.

5. The turbine engine structure of claim 1, wherein the oxidizer injector is configured to at least partially supplement air in said bypass flowpath with the oxidizer when said turbine engine structure is operating in the second condition.

6. The turbine engine structure of claim 1, further comprising a cooling system configured to cool at least one of non-core engine static structures and said engine fan using one of the jet fuel and the oxidizer.

7. The turbine engine structure of claim 1, wherein the jet fuel motor is forward of the engine core relative to an expected direction of fluid flow through the engine core.

8. The turbine engine structure of claim 1, wherein the oxidizer comprises at least one of liquid oxygen, nitrous oxide, and hydrogen peroxide.

9. The turbine engine structure of claim 8, wherein the oxidizer comprises a combination of liquid oxygen and nitrous oxide.

10. The turbine engine structure of claim 1, wherein the core cocooning feature is configured to at least partially isolate the engine core from the flowpath and prevent air in the flowpath from entering the engine core by at least partially closing of an inlet of the engine core.

11. A turbine engine structure comprising:
   an engine structure configured to operate as a turbofan engine in a first condition and configured to operate as a duct burner enhanced with oxidizer engine in a second condition;
   the turbofan engine comprising a fan forward of a turbine engine core;
   a core cocooning feature configured to selectively cocoon the turbine engine core by at least partially closing an inlet of the turbine engine core to prevent air from entering the turbine engine core;
   a jet fuel motor configured to drive the fan at a speed of invisibility during said second condition, wherein the jet fuel motor is a combustion motor distinct from and exterior to the turbine engine core of the turbine engine structure and wherein the jet fuel motor is configured to combust a jet fuel within an environment at least partially comprising an oxidizer;
   an oxidizer injector operable to at least partially supplement air in a bypass flowpath with the oxidizer while said engine structure is in said second condition; and a controller configured to control the core cocooning feature such that the turbine engine core is configured to be open in the first condition and cocooned in the second condition, and wherein the first condition is a Mach speed of the turbine engine structure below a first predetermined threshold, and the second condition is a Mach speed of the turbine engine structure above a second predetermined threshold.

12. The turbine engine structure of claim 11, wherein the engine structure is further configured to operate as a duct burner engine in a third condition.

13. The turbine engine structure of claim 12, wherein the third condition is a Mach speed of the turbine engine structure between a first predetermined threshold and a second predetermined threshold.

14. The turbine engine structure of claim 11, wherein the engine structure is configured to operate as a direct drive turbofan engine in said first condition.

15. A method for operating a turbine engine comprising:
    operating a turbine engine structure comprising an engine core and an engine fan forward of said engine core in a turbofan mode when the turbine engine is in a first condition;
    cocooning the turbine engine structure when the turbine engine structure enters a second condition by at least partially isolating an engine core from a flowpath and preventing air in the flowpath from entering the engine core, wherein at least partially isolating the engine core includes at least partially closing off an inlet of the engine core; and
    operating the turbine engine structure in a duct burner enhanced with oxidizer mode when the turbine engine structure is in said second condition, and driving said engine fan using a combustion based jet fuel motor connected to the engine fan during said second condition, wherein the jet fuel motor is a combustion motor distinct from and exterior to the turbine engine structure and is configured to combust a jet fuel within an environment at least partially comprising an oxidizer;
    wherein operating the turbine engine structure in the duct burner enhanced with oxidizer mode comprises at least partially supplementing air in a bypass flowpath surrounding said turbine engine structure with the oxidizer upstream of a plurality of jet fuel burners located within the bypass flowpath; and
    wherein the first condition is a Mach speed of the turbine engine structure below a first predetermined threshold, and the second condition is a Mach speed of the turbine engine structure above a second predetermined threshold.

16. The method of claim 15, further comprising operating the turbine engine structure in a duct burner mode when the turbine engine structure is in a third condition.

17. The method of claim 15, wherein at least partially isolating the engine core from a flowpath and preventing air in the flowpath from entering the engine core prevents said engine core from operating as a gas turbine engine during the second condition.

* * * * *